(12) United States Patent
Cueff et al.

(10) Patent No.: US 6,958,789 B2
(45) Date of Patent: Oct. 25, 2005

(54) OPTICAL DEVICE, PARTICULARLY A LIQUID-CRYSTAL IMAGING DEVICE, AND MIRROR THEREFOR

(75) Inventors: Bernard Cueff, St Aubin de Medoc (FR); Christophe Labille, Le Taillan Medoc (FR); Serge Ediar, Lege Cap Ferret (FR)

(73) Assignee: Thales, Paris (FR)

( * ) Notice: Subject to any disclaimer, the term of this patent is extended or adjusted under 35 U.S.C. 154(b) by 127 days.

(21) Appl. No.: 10/480,158

(22) PCT Filed: Jun. 4, 2002

(86) PCT No.: PCT/FR02/01894

§ 371 (c)(1),
(2), (4) Date: Dec. 10, 2003

(87) PCT Pub. No.: WO03/001110

PCT Pub. Date: Jan. 3, 2003

(65) Prior Publication Data

US 2004/0155993 A1    Aug. 12, 2004

(30) Foreign Application Priority Data

Jun. 22, 2001   (FR) ................................ 01 08281

(51) Int. Cl.⁷ .......................................... G02F 1/1335
(52) U.S. Cl. ......................... 349/61; 349/61; 349/62; 349/63; 349/64; 349/65; 349/66; 349/67; 349/68; 349/69; 349/70; 349/71; 349/58; 362/26; 362/31; 362/561; 40/546; 345/102

(58) Field of Search .............................. 349/61–71, 58; 362/26, 31, 561; 40/546; 345/102

(56) References Cited

U.S. PATENT DOCUMENTS

| 2,548,126 A |   | 4/1951 | Sholkin |
| 4,826,294 A | * | 5/1989 | Imoto ........................ 349/67 |
| 5,293,262 A | * | 3/1994 | Adachi et al. ............. 349/149 |

FOREIGN PATENT DOCUMENTS

WO    99 18391 A    4/1999

* cited by examiner

Primary Examiner—Robert H. Kim
Assistant Examiner—(Nancy) Thanh-Nhan P. Nguyen
(74) Attorney, Agent, or Firm—Lowe Hauptman & Berner, LLP

(57) ABSTRACT

The invention relates to the field of optical devices, in particular liquid crystal imagers, as well as the mirrors associated with these optical devices.

The optical device is angled, and includes at least one lamp and a channel guiding at least some of the light coming from the lamp, as well as a mirror in an angled part of the optical device, consisting of a sheet which is folded so that, on the one hand, it can be partially introduced into the channel and, on the other hand, once introduced into the channel and immobilized therein, it can reflect some of the light coming from the lamp into a determined direction.

The invention may, in particular, be applied to liquid crystal imagers for military aircraft.

20 Claims, 2 Drawing Sheets

OPTICAL DEVICE, PARTICULARLY A LIQUID-CRYSTAL IMAGING DEVICE, AND MIRROR THEREFOR

BACKGROUND OF THE INVENTION

1. Field of the Invention

The invention relates to the field of optical devices, in particular liquid crystal imagers, as well as the mirrors associated with these optical devices.

The preferred field of application of the invention is the field of liquid crystal imagers, also referred to as LCD imagers (LCD being the abbreviation for "liquid crystal display". Liquid crystal imagers are generally illuminated through the rear of the imager, the front of the imager being occupied by the liquid crystal screen. This illumination is generally carried out using lamps, often tube lamps, which lamps are advantageously, on the one hand, positioned parallel to the liquid crystal screen, and, on the other hand, accommodated in an optically matched support, which support is referred to as a light box. The number and size of the lamps vary as a function of the size of the liquid crystal screen and the illumination uniformity required by the particular application in question.

The invention applies particularly to the liquid crystal imagers used in aircraft, airplanes or helicopters. This is because the liquid crystal imagers of military aircraft have a day illumination stage producing intense and relatively uniform illumination with the aid of numerous lamps, also referred to as day lamps, as well as a night illumination stage producing weaker illumination, scattered more uniformly and needing to be infrared-filtered, particularly in order to avoid hampering or blinding pilots who are wearing certain equipment such as night vision goggles, the night illumination being carried out with the aid of one or two lamps, also referred to as night lamps. The day lamps and the night lamps generally operate mutually exclusively. The day lamps are placed as close as possible to the liquid crystal screen, so as to illuminate this screen as directly as possible with a maximum intensity. The general direction of the light emitted by the night lamps will consequently be less direct. The invention therefore relates to a liquid crystal imager as well as the mirror which is associated with it, this mirror being placed in the path of the light which comes from the night lamps and which will illuminate the liquid crystal screen.

2. Description of the Prior Art

A first prior art provides an optical device, and more precisely a liquid crystal imager in which, on the one hand, the day lamps are located just behind the liquid crystal screen, and, on the other hand, the night lamp or lamps are located at the bottom of the light box, behind the day lamps, an infrared filter being arranged between the day lamps and the night lamps.

FIG. 1 schematically represents a view in section of a liquid crystal imager according to the first prior art. A light box 1 is closed by a liquid crystal screen 5. The light box 1 is separated into two compartments by an infrared filter 4. There are a plurality of day lamps 2 in the front part of the light box 1, i.e. between the liquid crystal screen 5 and the infrared filter 4. There are one or more night lamps 3 in the rear part of the light box 1, i.e. between the infrared filter 4 and the bottom of the light box 1. Dot-and-dash arrows represent light rays coming from the day lamps 2. Dashed arrows represent light rays coming from the night lamps 3.

The first prior art has several drawbacks. One drawback of the first prior art relates to the significant depth P of the light box 1. Another drawback of the first prior art involves the large dimensions of the infrared filter 4, which are of the same order of magnitude as those of the liquid crystal screen 5, which dimensions may be, for example, typically as much as ten or so centimeters on a side. The infrared filter 4 consists of processed glass with a small thickness, however, which makes it relatively fragile, expensive and difficult to cut. Another drawback of the first prior art is due to the fact that the efficiency of the light stage is impaired by the presence of the infrared filter 4, which is located just behind the day lamps 2 and by which the received light coming from the day lamps 2 is not reflected toward the liquid crystal screen 5. When the liquid crystal screen 5 is of rectangular rather than square shape, another drawback of the first prior art is due to the length difference between the day lamps 2 and the night lamps 3, leading to two separate component references, one per type of lamp, which tends to increase the number of component references for the liquid crystal imager. Another drawback of the first prior art is that of creating light halos around the night lamp or lamps 3.

A second prior art provides an optical device, and more precisely a liquid crystal imager in which, on the one hand, the day lamps are arranged at the bottom of the light box, and, on the other hand, a night lamp is fitted at the bottom of a separate and filtered channel, so as to illuminate the end of an optical prism which is designed so as to be able to scatter the light coming from the night lamp uniformly over the entire surface of the liquid crystal screen.

FIG. 2 schematically represents a view in section of a liquid crystal imager according to the second prior art. A light box 1 is closed by a liquid crystal screen 5. There are a plurality of day lamps 2 in the rear part of the light box 1, i.e. close to the bottom 10 of the light box 1. The bottom 10 of the light box 1 is reflective so that the light emitted by the day lamps 2 toward the rear of the light box 1 can be reflected by it toward the liquid crystal screen 5. On one side of the light box 1, behind the reflective bottom 10, there is a night lamp 3 located at the bottom of a channel 9. Dot-and-dash arrows represent light rays coming from the day lamps 2. Dashed arrows represent light rays coming from the night lamp 3. An optical prism 6 is placed between the liquid crystal screen 5 and the day lamps 2, some of the optical prism 6 being located at the exit of the channel 9. The shape of the optical prism 6 is such that at least some of the light being emitted by the night lamp 3, and having passed through the channel 9, firstly passes through the face 61 of the optical prism 6, then is reflected by the face 62 of the optical prism 9, and subsequently arrives at the face 63 of the prism before finally being scattered in the direction of the liquid crystal screen 5 by a diffuser 8 located against the face 63. The optical prism 6 is designed so as to scatter the light arriving at its face 63 uniformly over the entire surface of the liquid crystal screen 5 by means of the diffuser 8. A layer 7 of adhesive, located against the face 64 of the optical prism 6, helps secure this optical prism 6 to the light box 1. An infrared filter 4, located against the face 61 of the optical prism 6, makes it possible to filter the light coming from the night lamp 3 before it arrives at the liquid crystal screen 5.

The second prior art has several drawbacks. One drawback of the second prior art relates to the use of an optical prism 6, which is made of heavy and fragile glass. Another drawback of the second prior art involves the production of the optical prism 6, since this production is difficult and expensive. Another drawback of the second prior art, due to the use of the optical prism 6 for the night stage, is the limitation of the performance of the day stage of the optical imager, since the optical prism remains permanently between the liquid crystal screen 5 and the day lamps 2. Another drawback of the second prior art results from the actual shape of the optical prism 6, which prevents a second night lamp 3 from being installed on the other side of the light box 1, thus preventing the production of an imager with large dimensions containing a liquid crystal screen 5 likewise with large dimensions; in fact, this type of liquid crystal screen 5 with large dimensions often requires the use of two night lamps 3 in order to be illuminated sufficiently uniformly by scattering and with a sufficient intensity. An imager with large dimensions is, for example, an imager having a liquid crystal screen in the form of a square measuring more than ten or so centimeters per side, for example twenty or so centimeters per side.

A third prior art provides an optical device, and more precisely a liquid crystal imager in which, on the one hand, the day lamps are arranged at the bottom of the light box, and, on the other hand, one or two night lamps are each fitted on the side of the light box, so as to illuminate the side-edge of a night light guide. This night light guide is substantially flat, and is structured so that the light which arrives perpendicularly to one and/or the other of its side-edges can be returned by it perpendicularly to one of its faces. This light guide may also be used in an imager according to the invention. An example of such a night light guide is represented in FIG. 3.

FIG. 3 schematically represents a view in perspective of an element belonging to a liquid crystal imager according to a third prior art as represented in FIG. 4, said element being a light guide. This light guide may also be used in the scope of the invention. The light guide is in the form of a substantially flat element, which is structured so that the light received perpendicularly to one and/or the other of its side-edges 110 is returned by it substantially perpendicularly to one of its faces, for example the face 111. The propagation of the light is represented here by dashed arrows. The structure of the light guide is a particular one so that the light received perpendicularly to one of its side-edges 110 can be returned by it perpendicularly to its face 111, by scattering or by diffraction. Here, for example, the face 111 is striated, and has a set of mutually parallel striations 112. Instead of having striations on one of its faces, the light guide may have microprisms obtained, for example by hot compression. The material of the light guide is, for example, PMMA, i.e. plexiglas (registered trademark), because this has very good optical transparency. The type of light guide used in the imager according to the third prior art, or according to the invention, is for example a "flat collimator" from "Briteview Technologies" (registered trademark) which is described in particular in a document entitled "A1.3: flat collimator: a backlighting assembly utilizing microprisms for high energy efficiency" written by "C-Y. TAI & H. ZOU" and published in "SID 94 Applications Digest".

FIG. 4 schematically represents a view in section of a liquid crystal imager according to a third prior art. A light box 1 is closed by a liquid crystal screen 5. There are a plurality of day lamps 2 in the rear part of the light box 1, i.e. close to the bottom 10 of the light box 1. The bottom 10 of the light box 1 is reflective so that the light emitted by the day lamps 2 toward the rear of the light box 1 can be reflected by it toward the liquid crystal screen 5. Between the liquid crystal screen 5 and the day lamps 2, there is the light guide 11 described, for example, in FIG. 3. On each side of the light box 1, there is a night lamp 3 arranged facing one of the side-edges 110 of the light guide 11. The face 111 of the light guide 11 is arranged parallel to the surface of the liquid crystal screen 5. There is an infrared filter 4 between each of the lamps 3 and each of the side-edges 110 of the light guide 11. Dot-and-dash arrows represent light rays coming from the day lamps 2. Dashed arrows represent light rays coming from the night lamp 3. Some of the light emitted by the day lamps 2 passes through the light guide 11 before arriving at the liquid crystal screen 5. Some of the light emitted by the night lamps 3 passes through the infrared filter 4, and enters the light guide 11 through the side-edge 110 of this guide 11 before emerging through the face 111 of the same guide 11, in order to arrive at the liquid crystal screen 5.

A drawback of the third prior art is that it has too large a length L of the imager, due to the successive presence over the length L of a night lamp 3, an infrared filter 4, a light guide 11, and optionally another infrared filter 4 and another night lamp 3.

The problem of the first and second prior arts is that of having a number of drawbacks, while the problem of the third prior art is that of having one major drawback, particularly for certain applications such as liquid crystal imagers.

SUMMARY OF THE INVENTION

It is an object of the invention to provide an optical device, and in particular a liquid crystal imager, in which some or all of the drawbacks of the various prior arts are reduced or eliminated. The optical device according to the invention is preferably a liquid crystal imager. Owing to its numerous advantages, details of which are given below, the invention may nevertheless be applied to optical devices other than liquid crystal imagers. The optical device according to the invention has the following advantages over some or all of the various prior arts: firstly it can be accommodated in a relatively small space, particularly in terms of lateral size (in width), secondly it is relatively light, simple to produce and inexpensive, and thirdly it is compatible with the presence of two night lamps. The invention relates both to an optical device, and its preferred field of application which is a liquid crystal imager, and to a mirror which is the particularly innovative element of said optical device.

The invention provides an angled optical device including at least one lamp and a channel guiding at least some of the light coming from the lamp, characterized in that the optical device includes a mirror in an angled part of the optical device, consisting of a sheet which is folded so that, on the one hand, it can be partially introduced into the channel, and, on the other hand, once introduced into the channel and immobilized therein, it can reflect some of the light coming from the lamp into a determined direction.

The invention also provides a liquid crystal imager including a liquid crystal screen located in the front part of the imager, at least one night lamp, a channel guiding at least some of the light coming from the night lamp, and a substantially flat night light guide which is structured so that the light entrant through one of its side-edges is returned by it substantially perpendicularly to one of its surfaces, characterized in that the night lamp is located in the rear part of the imager and in that the imager also includes a mirror consisting of a sheet which is folded so that, on the one hand, it can be partially introduced into the channel, and, on the other hand, once introduced into the channel and immobilized therein, it can reflect some of the light coming from the night lamp into the direction of the side-edge of the night light guide.

The invention furthermore provides a mirror for an optical device, characterized in that the mirror consists of a sheet which is folded so as to have a substantially flat main part, having at least two sides which are substantially parallel to one another and comprise at least one reflective face, a substantially flat extreme part, a substantially flat intermediate part, having at least two sides which are substantially parallel to one another, two substantially flat flaps, the two flaps being respectively attached to each of the two parallel sides of the intermediate part and being substantially perpendicular to the intermediate part, the main part being attached by one of its substantially parallel sides to one of the sides of the intermediate part which are not attached to a flap, and by the other of its substantially parallel sides to the extreme part, and in that the angle between the main part and the intermediate part, as well as the angle between the main part and the extreme part, are obtuse angles.

BRIEF DESCRIPTION OF THE DRAWINGS

The invention will be understood more clearly, and other features and advantages will become apparent from the following description and the appended drawings which are given as examples, in which.

MORE DETAILED DESCRIPTION

Figure 1:
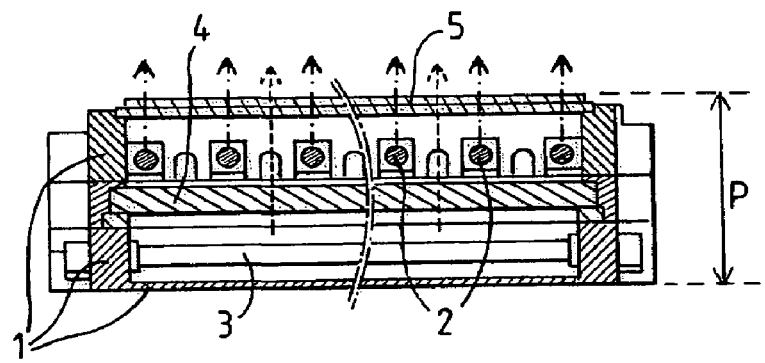
FIG. 1 schematically represents a view in section of a liquid crystal imager according to a first prior art.
Figure 2:
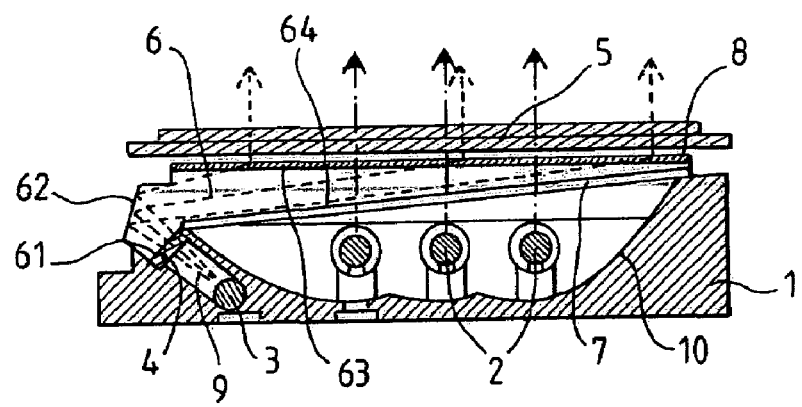
FIG. 2 schematically represents a view in section of a liquid crystal imager according to a second prior art.
Figure 3:
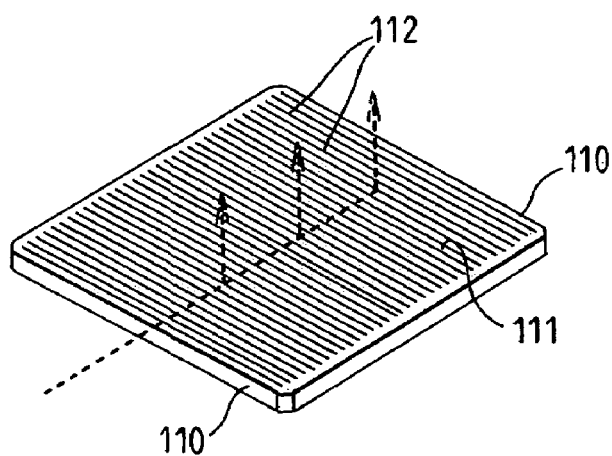
FIG. 3 schematically represents a view in perspective of an element belonging to a liquid crystal imager according to a third prior art as represented in FIG. 4, or according to the invention, said element being a light guide.
Figure 4:
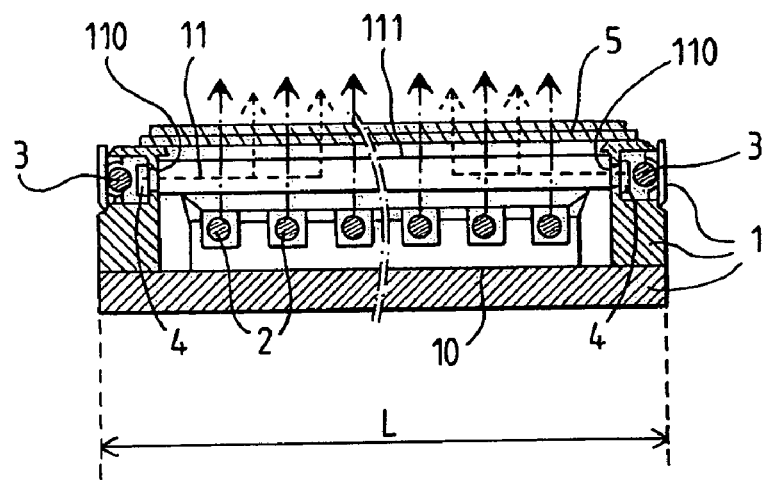
FIG. 4 schematically represents a view in section of a liquid crystal imager according to a third prior art.
Figure 5:
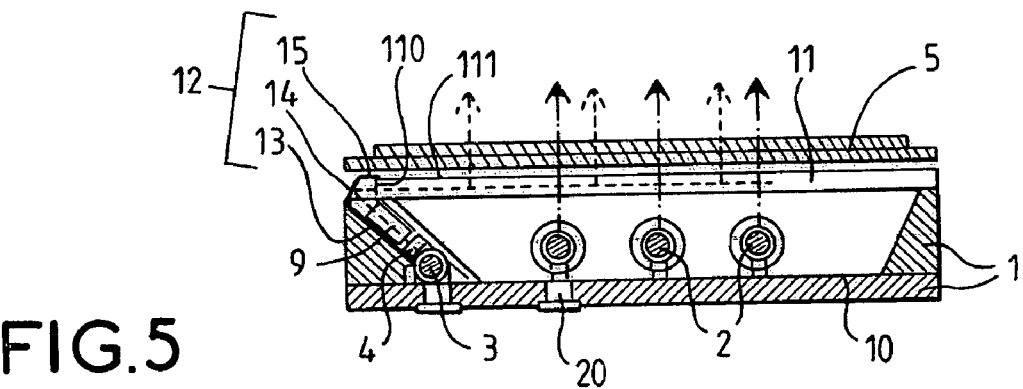
FIG. 5 schematically represents a view in section of a liquid crystal imager according to the invention.

FIG. 5 schematically represents a view in section of a liquid crystal imager according to the invention. A light box 1 is closed by a liquid crystal screen 5. There are a plurality of day lamps 2 which are all mutually parallel in the rear part of the light box 1, i.e. close to the bottom 10 of the light box 1. The bottom 10 of the light box 1 is reflective so that the light emitted by the day lamps 2 toward the rear of the light box 1 can be reflected by it toward the liquid crystal screen 5. Between the liquid crystal screen 5 and the day lamps 2, there is the night light guide 11 described, for example, in FIG. 3, and also referred to as the light guide 11. On one side of the light box 1, in the rear part of the light box 1, there is a night lamp 3 located at the bottom of a channel 9. The channel 9 is intended to guide the light coming from the night lamp 3, or at least some of this light. The night lamp 3 could be located in the channel 9 or behind the channel 9, so long as the relative arrangement of the channel 9 and the night lamp 3 allows the channel 9 to guide a sufficient amount of the light coming from the night lamp 3 so as to illuminate the liquid crystal screen 5 in the application in question. A second night lamp 3 could also be located on the other side of the light box 1. The average propagation direction of the light emitted by the night lamp 3 is not the same in the channel 9 as in the guide 11, for which reason the optical architecture of the night stage is angled between the exit of the channel 9 and the side-edge 110 of the light guide 11, through which side-edge the light enters the guide 11. The face 111 of the light guide 11 is arranged parallel to the surface of the liquid crystal screen 5. There is a mirror 12 in the angled passage of the optical architecture of the night stage, making it possible to angle said optical architecture. The mirror 12 consists of a folded sheet having a plurality of parts, including two lateral parts connected by a central part. One of the lateral parts is the extreme part 13, which is located in the channel 9 and which advantageously allows autocentering and immobilization of the sheet in the channel 9, leaving the sheet with only one degree of freedom which is the possibility of sliding in the channel 9. The other lateral part 15 acts as a stop when the extreme part 13 slides in the channel 9. The extreme part 13 slides in the channel 9 until the extreme part 15 abuts against the face 111 of the light guide 11. The central part 14 of the sheet is reflective, at least for some of the light emitted by the night lamp 3, so that the light coming from the night lamp 3 and emergent from the channel 9 is at least partially reflected in the direction of the side-edge 110 of the light guide 11 by the central part of the sheet 14, i.e. of the mirror 12. In the channel 9, or at the end of the channel 9, there is an infrared filter 4 intended to filter the light coming from the night lamp 3 before this light reaches the light guide 11. Dot-and-dash arrows represent light rays coming from the day lamps 2. Dashed arrows represent light rays coming from the night lamp 3. Some of the light emitted by the day lamps 2 passes through the light guide 11 before arriving at the liquid crystal screen 5. Some of the light emitted by the night lamps 3 passes through the infrared filter 4, travels along the channel 9 while being optionally reflected from the walls of this channel 9, is reflected by the central part 14 of the mirror 12, and enters the light guide 11 through the side-edge 110 of this guide 11 to emerge through the face 111 of the same guide 11, before arriving at the liquid crystal screen 5. Behind the day lamps 2, as behind the night lamp 3, there is at least one sensor 20 in charge of controlling the intensity of the lamps. The night lamp 3 is advantageously the same as the day lamps 2. The interior of the channel is preferably painted white in order to reflect the light coming from the night lamp 3.

The sheet which constitutes the mirror is preferably folded into at least three parts, a central part reflecting the light coming from the lamp and two lateral parts which are connected to one another by the central part, the lateral part closest to the lamp being able to slide in the channel, and the lateral part furthest from the lamp being able to act as a stop when the lateral part closest to the lamp slides.

Figure 6:
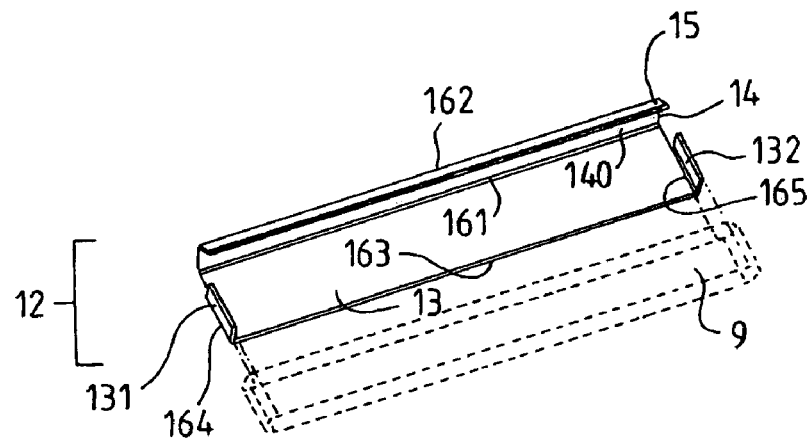
FIG. 6 schematically represents a view in perspective of an element belonging to a liquid crystal imager according to the invention as represented in FIG. 5, said element being a mirror.

Preferably, the mirror consists of a sheet which is folded so as to have a main part, an extreme part, an intermediate part and two flaps. The main part is substantially flat, has at least two sides which are substantially parallel to one another and comprises at least one reflective face. The extreme part is substantially flat. The intermediate part is substantially flat, and has at least two sides which are substantially parallel to one another. The two flaps are substantially flat, are respectively attached to each of the two parallel sides of the intermediate part and are substantially perpendicular to the intermediate part. In addition, the main part is attached by one of its substantially parallel sides to one of the sides of the intermediate part which are not attached to a flap, and by the other of its substantially parallel sides to the extreme part. Furthermore, the angle between the main part and the intermediate part, as well as the angle between the main part and the extreme part, are obtuse angles. Preferably, the main part, the intermediate part and the extreme part, as well as the flaps are substantially rectangular. FIG. 6 schematically represents a view in perspective of such a mirror.

In FIG. 6, the mirror consists of a folded sheet having a plurality of parts, including the extreme part 15, the main part 14 with its reflective face 140, the intermediate part 13, and the two flaps 131 and 132. There is a fold 162 between the extreme part 15 and the main part 14. There is a fold 161 between the main part 14 and the intermediate part 13. The two substantially parallel sides of the main part 14 are the two folds 162 and 161. Between the flaps 131 and 132, on the one hand, and the intermediate part 13, there are respectively folds 164 and 165. The two substantially parallel sides of the intermediate part 13 are the two folds 164 and 165. The free side of the intermediate part 13 consists of an edge 163. An example of a channel 9 with an oblong shape is represented by dashed lines, the oblong shape being due to the elongated tube shape of the night lamp 3. The assembly consisting of the intermediate part 13 and the flaps 131 and 132 can slide inside the channel 9. This sliding movement inside the channel 9 is limited by a stop consisting of the extreme part 15, which will abut against the light guide (not shown in FIG. 6 for the sake of clarity).

The mirror is mainly composed advantageously of three parts, a central reflective part, and two lateral parts which are located on either side of the central part, and which are a sliding part and a sliding stop part.

In FIG. 6, representing a preferred example of a mirror, the reflective part consists of the main part 14 with its reflective face 140, the sliding part consists of the intermediate part 13 and the two flaps 131 and 132, and the sliding stop part consists of the extreme part 15.

Preferably, both the sheet constituting the mirror is sheet-metal, which is sufficiently thin to be sufficiently resilient, and the dimensions of the sheet are sufficiently large in relation to the dimensions of the channel, so that the sheet can both be autocentered and immobilized in the channel. The thin nature of the sheet-metal allows it to be resilient and provides it with a spring effect. The thin nature of the sheet-metal also has the advantage of taking up little space in the channel and of leaving essentially all the interior volume of the channel free for propagation of the light coming from the night lamp or lamps. The thin nature of the sheet-metal is, however, limited because the sheet must have a minimum rigidity in order to retain its general shape and a minimum strength. It is the combination of these two properties of resilience and dimensioning of the sheet which will allow said sheet to be able to be autocentered and immobilized in the channel. To be precise, firstly, on the one hand the dimensions of the sheet, and more precisely of the sliding part of the sheet, are sufficiently small in relation to the dimensions of the channel and, on the other hand, the sheet, and more precisely the sliding part of the sheet, is sufficiently resilient, so that the sliding part of the sheet can be introduced into the channel and slide in the channel. Secondly, on the one hand the dimensions of the sheet, and more precisely of the sliding part of the sheet, are sufficiently large in relation to the dimensions of the channel and, on the other hand, the sheet, and more precisely the sliding part of the sheet, is sufficiently resilient, so that the sliding part of the sheet once introduced into the channel, and having slid in the channel until the stop part of the sheet has come to abut against the light guide, can be autocentered and immobilized in the position which has been reached. The spring effect also makes it possible to absorb slight variations in dimensions of the mirror and/or of the channel, from one mirror and/or one channel to another. Fitting and removal of the mirror consisting of the sheet are carried out in an extremely simple and quick way, and can even be carried out by hand without the aid of any tool; this is because the only delicate part of the mirror is the reflective face of the main part, but it is not very exposed since this face is an internal face. Fitting and removal do not require any adjustment operation, which makes them particularly attractive.

In FIG. 6, all of the above is made possible by an expedient choice of the dimensions, as well as the resilience, of the intermediate part 13 and of the flaps 131 and 132. Said dimensions are advantageously substantially identical to those of the interior of the channel, the introduction of the sliding part of the sheet into the channel, then its autocentering and its immobilization, taking place by virtue of said resilience. It is in particular the resilience of the flaps, which by moving away from each other are able to center and immobilize in the channel the sliding part of the sheet, i.e. the assembly consisting of the intermediate part and the flaps, which is why the term autocentering is used; in order to permit this autocentering and this immobilization in the channel, the dimension of the flaps is slightly larger than the corresponding dimension of the channel. The width of the flaps is therefore slightly greater than the width of the channel.

Another possibility, which is not as good, might consist in taking a nonresilient sheet with dimensions slightly smaller than those of the channel, and, once this sheet is introduced into the channel, immobilizing it with adhesive bonding by introducing some adhesive between the flaps of the sheet and the oblong ends of the channel. The centering of the sliding part of the sheet in the channel, however, is then less precise because the sheet with relatively small dimensions in relation to those of the channel can easily move inside the channel through degrees of freedom other than the sliding direction. Furthermore, fitting of the mirror with the aid of an adhesive, and a fortiori removal of the same mirror, is much less practical than in the preferred case of the invention in which the autocentering and the immobilization are carried out by virtue of the resilience and dimensioning of the sheet constituting the mirror.

Preferably, the sheet which is sufficiently thin to be autocentered and immobilized in the channel has a thickness amounting to a few tenths of a millimeter. The thickness of the sheet may, for example, be three tenths of a millimeter.

The sheet is preferably a metal sheet. The sheet could also be made of stainless steel or metallized plastic, but both these materials have drawbacks. Stainless steel offers possibilities which are not as good as metal in terms of quality of reflection, because it is less easy to put reflective coating layers on top. Metallized plastic has the drawback of being either somewhat too flexible in a small thickness, or somewhat too frangible in larger thickness; metallized plastic also lacks stiffness.

The material of the sheet advantageously contains copper. The material of the sheet is preferably copper-beryllium of formula $CuBe_2$, which allows the sheet to exhibit a more pronounced spring effect. In order to further improve the quality of the spring effect of the sheet constituting the mirror, the sheet of copper-beryllium sheet-metal is advantageously heat treated by carrying out an anneal at about 320° C. for about 3 hours and 45 minutes.

Preferably, the sheet is a metal sheet which is at least partially tin-plated so as to better reflect the light from the night lamp. Tin-plating means covering with tin. At least the surface 140 is then tin-plated. For the sake of simplifying the tin-plating method and reducing its cost, the sheet is preferably tin-plated in its entirety. Other methods for obtaining the intended reflectivity quality of the mirror may be envisaged, but this is particularly simple and effective. At least the tin-plated part of the metal sheet is preferably covered with a protective varnish which is transparent to the light from the lamp, in order to reduce the risks of damaging this tin-plated part.

What is claimed is:

1. An angled optical device comprising:
    a lamp and a channel guiding at least some of the light coming from the lamp;
    a mirror in an angled part of the optical device, including a sheet which is folded to be partially introduced into the channel and
    once introduced into the channel and immobilized therein, said sheet can reflect some of the light coming from the lamp in a determined direction.

2. The optical device as claimed in claim 1, wherein said device is a liquid crystal imager including a liquid crystal screen located in the front part of the imager and a substantially flat night light guide which is structured so that the light which enter through one of its side-edges is returned by it substantially perpendicularly to one of its surfaces, the lamp being at least one night lamp located in the rear part of the imager, the sheet constituting the mirror once introduced into the channel and immobilized therein, reflecting some of the light coming from the night lamp into the direction of the side-edge of the night light guide.

3. The optical device as claimed in claim 1, wherein both the sheet is sheet-metal, which is sufficiently thin to be sufficiently resilient, and the dimensions of the sheet are sufficiently large in relation to the dimensions of the channel, so that the sheet can both be self-centered and immobilized in the channel.

4. The optical device as claimed in claim 1, wherein the sheet is folded into at least three parts, a central part reflecting the light coming from the lamp and two lateral parts which are connected to one another by the central part, the lateral part closest to the lamp being able to slide in the channel, and the lateral part furthest from the lamp being able to act as a stop when the lateral part closest to the lamp slides.

5. The optical device as claimed in claim 1, wherein the interior of the channel is painted white in order to reflect the light.

6. The optical device as claimed in claim 1, wherein that the sheet is a metal sheet.

7. The optical device as claimed in claim 6, wherein the material of the sheet contains copper.

8. The optical device as claimed in claim 7, wherein the material of the sheet is copper-beryllium of formula $CuBe_2$.

9. The optical device as claimed in claim 6, wherein the material of the sheet is a metal sheet which is at least partially tin-plated so as to better reflect the light from the lamp.

10. The optical device as claimed in claim 9, wherein at least the tin-plated part of the metal sheet is covered with a protective varnish which is transparent to the light from the lamp.

11. The optical device as claimed in claim 1, wherein the thickness of the sheet is a few tenths of a millimeter.

12. The optical device as claimed in claim 1, wherein the mirror consists of a sheet which is folded so as to have
    a substantially flat central reflective part, having at least two sides which are substantially parallel to one another and comprise at least one reflective face,
    a substantially flat sliding stop part,
    a substantially flat sliding part, having at least two sides which are substantially parallel to one another,
    two substantially flat flaps,
    the two flaps being respectively attached to each of the two parallel sides of the sliding part and being substantially perpendicular to the sliding part,
    the central reflective part being attached by one of its substantially parallel sides to one of the sides of the sliding part which are not attached to a flap, and by the other of its substantially parallel sides to the sliding stop part,
    and in that the angle between the central reflective part and the sliding part, as well as the angle between the central reflective part and the sliding stop part, are obtuse angles.

13. The optical device as claimed in claim 12, wherein the central reflective part, the sliding part and the sliding stop part, as well as the flaps, are substantially rectangular.

14. The optical device as claimed in claim 2, wherein both the sheet is sheet-metal, which is sufficiently thin to be sufficiently resilient, and the dimensions of the sheet are sufficiently large in relation to the dimensions of the channel, so that the sheet can both be self-centered and immobilized in the channel.

15. The optical device as claimed in claim 2, wherein the sheet is folded into at least three parts, a central part reflecting the light coming from the lamp and two lateral parts which are connected to one another by the central part, the lateral part closest to the lamp being able to slide in the channel, and the lateral part furthest from the lamp being able to act as a stop when the lateral part closest to the lamp slides.

16. The optical device as claimed in claim 3, wherein the sheet is folded into at least three parts, a central part reflecting the light coming from the lamp and two lateral parts which are connected to one another by the central part, the lateral part closest to the lamp being able to slide in the channel, and the lateral part furthest from the lamp being able to act as a stop when the lateral part closest to the lamp slides.

17. The optical device as claimed in claim 7, wherein the material of the sheet is a metal sheet which is at least partially tin-plated so as to better reflect the light from the lamp.

18. The optical device as claimed in claim 8, wherein the material of the sheet is a metal sheet which is at least partially tin-plated so as to better reflect the light from the lamp.

19. The optical device as claimed in claim 2, wherein the mirror consists of a sheet which is folded so as to have
    a substantially flat central reflective part, having at least two sides which are substantially parallel to one another and comprise at least one reflective face,
    a substantially flat sliding stop part,
    a substantially flat sliding part, having at least two sides which are substantially parallel to one another,
    two substantially flat flaps,
    the two flaps being respectively attached to each of the two parallel sides of the sliding part and being substantially perpendicular to the sliding part,
    the central reflective part being attached by one of its substantially parallel sides to one of the sides of the sliding part which are not attached to a flap, and by the other of its substantially parallel sides to the sliding stop part, and in that the angle between the central reflective part and the sliding part, as well as the angle between the central reflective part and the sliding stop part, are obtuse angles.

20. The optical device as claimed in claim 3, wherein the mirror consists of a sheet which is folded so as to have a substantially flat central reflective part, having at least two sides which are substantially parallel to one another and comprise at least one reflective face, a substantially flat sliding stop part, a substantially flat sliding part, having at least two sides which are substantially parallel to one another, two substantially flat flaps, the two flaps being respectively attached to each of the two parallel sides of the sliding part and being substantially perpendicular to the sliding part, the central reflective part being attached by one of its substantially parallel sides to one of the sides of the sliding part which are not attached to a flap, and by the other of its substantially parallel sides to the sliding stop part, and in that the angle between the central reflective part and the sliding part, as well as the angle between the central reflective part and the sliding stop part, are obtuse angles.

* * * * *